United States Patent [19]

Ishikawa

[11] Patent Number: 4,888,618
[45] Date of Patent: Dec. 19, 1989

[54] IMAGE FORMING APPARATUS HAVING AMBIENT CONDITION DETECTING MEANS

[75] Inventor: Tadashi Ishikawa, Tokyo, Japan

[73] Assignee: Canon Kabushiki Kaisha, Tokyo, Japan

[21] Appl. No.: 145,600

[22] Filed: Jan. 19, 1988

[30] Foreign Application Priority Data

Jan. 19, 1987 [JP] Japan ................. 62-009561
Jan. 19, 1987 [JP] Japan ................. 62-009562
Jan. 19, 1987 [JP] Japan ................. 62-009563

[51] Int. Cl.[4] .............. G03G 15/01; G03G 15/08
[52] U.S. Cl. ............................. 355/208; 355/214; 355/246; 355/326
[58] Field of Search ........... 355/4, 3 CH, 14 CH, 355/14 D, 14 R, 208, 214, 215, 206, 326–328, 219, 246, 225; 346/157; 430/42, 43; 358/80

[56] References Cited

U.S. PATENT DOCUMENTS

| | | | |
|---|---|---|---|
| 4,502,777 | 3/1985 | Okamoto et al. | 355/14 CH X |
| 4,618,238 | 10/1986 | Maitani et al. | 354/431 |
| 4,618,246 | 10/1986 | Nagashima et al. | 355/14 R |
| 4,624,548 | 11/1986 | Takayanagi | 355/14 D |
| 4,627,712 | 12/1986 | Usami | 355/14 R |
| 4,736,223 | 4/1988 | Suzuki | 355/4 |

FOREIGN PATENT DOCUMENTS

| | | | |
|---|---|---|---|
| 57-178253 | 11/1982 | Japan | 355/4 |
| 58-127948 | 7/1983 | Japan | 355/14 CH |
| 58-154855 | 9/1983 | Japan | 355/4 |
| 58-217960 | 12/1983 | Japan | 355/14 D |
| 61-156067 | 7/1986 | Japan | 355/4 |

OTHER PUBLICATIONS

The Patent Office Japanese Government, "Patent Abstracts of Japan", May 14, 1982, p. 3, E 106.

Primary Examiner—R. L. Moses
Assistant Examiner—J. Pendegrass
Attorney, Agent, or Firm—Fitzpatrick, Cella, Harper & Scinto

[57] ABSTRACT

An image forming apparatus includes a processor for processing image signals, an image forming system for forming images on recording mediums in accordance with the image signals processed by the processor, the image forming system being capable of forming the images in different colors, a detector for detecting an ambient condition, and a controller for controlling an image forming condition, relating to an image density, of the image forming system in accordance with an output of the detector and a color of image formation by the image forming system.

68 Claims, 8 Drawing Sheets

IMAGE FORMING APPARATUS HAVING AMBIENT CONDITION DETECTING MEANS

FIELD OF THE INVENTION AND RELATED ART

The present invention relates to an image forming apparatus wherein ambient condition or conditions are measured, in response to which an image forming condition or conditions are controlled.

It is conventional in an electrophotographic image forming apparatus that in order to maintain a constant density of the formed image, a potential of a charged photosensitive drum, a developing bias potential applied to a developing device or the like is adjusted so as to control the image forming conditions that influence a contrast potential of an image, a foggy background preventing potential or the like. Particularly, in a multicolor copying machine, an image forming condition is determined in response to the properties of the respective color developers so as to provide substantially the same image density for all colors, as disclosed in U.S. Ser. No. 330,551, now U.S. Pat. No. 4,736,223.

However, although the adjustment of the image forming conditions for the respective colors is performed in such conventional machines, no consideration is made to the variation of the image density resulting from variations in the ambient conditions under which the developers are placed. Particularly, the variation in the image density resulting from the variation in the ambient humidity is remarkable. Additionally, the degrees of the density changes resulting from moisture absorption are different if the colors of the developers are different, with the result that the density difference can be conspicuous.

U.S. Ser. No. 087,918, filed Aug. 21, 1987, and Japanese patent application No. 86465/1980 (Laid-Open No. 13855/1982) propose in the field of ink jet printers that temperature or humidity is detected, in response to which the image signal is controlled for each colors in a reference value of an A/D conversion, a gain of an amplifier, a coefficient of color correction of the like. However, the control of the image signal requires a high speed processing of the signal, which results in an expensive circuit.

In an ordinary copying machine using black toner, the method of maintaining a constant surface potential of the photosensitive member is changed in accordance with a humidity, as disclosed in U.S. Pat. No. 4,573,788. However, in this U.S. Patent, the surface potential is stabilized using a predetermined operational expression within a predetermined humidity range, but in the other range, the operational expression is not used, and measurement of the actual surface potential of the photosensitive member and adjustment of the charger and exposure amount are repeated so that the potential approaches the target potential, and therefore, the time required for reaching the target potential is very long as the case (humidity) may be.

SUMMARY OF THE INVENTION

Accordingly, it is a principal object of the present invention to provide an image forming apparatus which is substantially free from the above-described drawbacks.

It is another object of the present invention to provide an image forming apparatus by which an image can be formed in an optimum density independently of ambient conditions and colors in which the image is reproduced.

It is another object of the present invention to provide an image forming apparatus wherein density variations in the resultant image by a variation of an ambient condition under which the developer is placed is eliminated, and wherein the density difference in the resultant image depending on the developers is eliminated, so that an optimum density image can always be formed.

It is another object of the present invention to provide an image forming apparatus in which a direction of the change in the ambient condition is detected to always provide an optimum density image.

It is a further object of the present invention to provide an image forming apparatus which can be adapted to a possible density change by an ambient condition even at the time of initial operation or after the developer is replenished, thus providing an optimum density image.

It is a further object of the present invention to provide an image forming apparatus whereby an optimum density image can always be produced in consideration of the past ambience and the current ambience.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
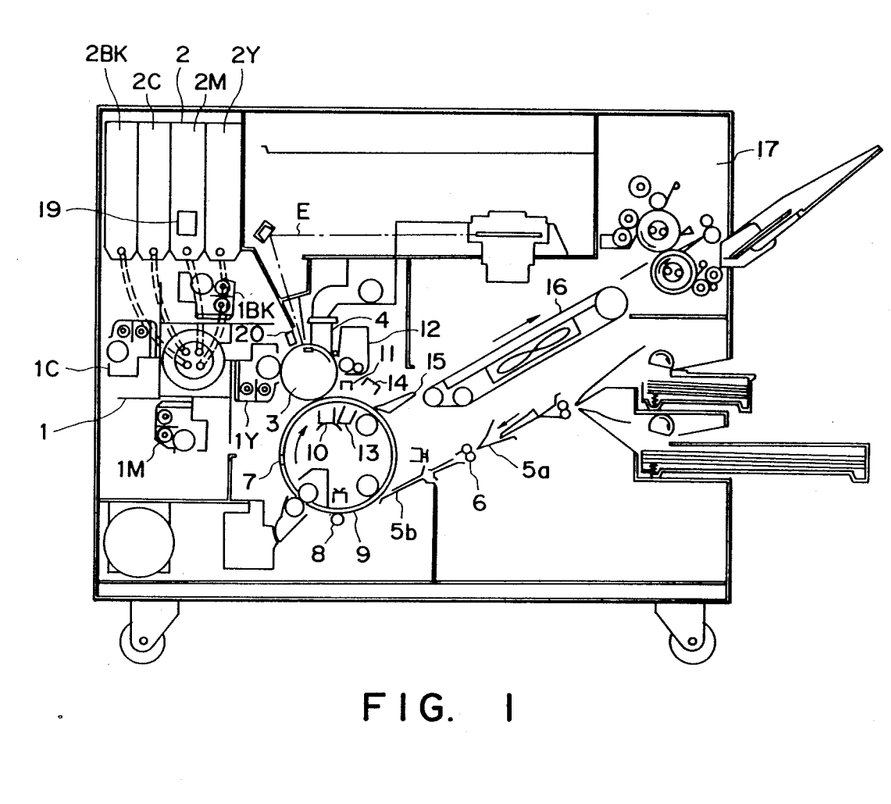
FIG. 1 is a sectional view of an image forming apparatus according to an embodiment of the present invention.

Referring to FIG. 1, there is shown an image forming apparatus according to an embodiment of the present invention. The image forming apparatus comprising a rotary type developing device 1 having a rotor carrying an yellow developing device 1Y, a magenta developing device 1M, a cyan developing device 1C and a black developing device 1BK. The apparatus further includes a developer (toner) supplying device for supplying the developer to the developing device 1. The supplying device 2 includes a yellow hopper 2Y, a magenta hopper 2M, a cyan hopper 2C and a black hopper 2BK.

The description will first be made as to a general operation of the color image forming apparatus, taking as an example a full-color mode operation. A photosensitive drum 3 is rotatable in the direction indicated by an arrow, and a surface thereof is uniformly charged by a charger 4. An unshown original is exposed to light, and an yellow image signal is obtained by a proper photoelectric conversion. A laser beam E is modulated in accordance with the yellow image signal and is projected onto the surface of the charged photosensitive drum 3, so that an electrostatic latent image is formed on the photosensitive drum 3. Then, the yellow developing device 1Y situated beforehand to its developing position develops the electrostatic latent image. Which one of the developing devices 1Y, 1M, 1C and 1BK is placed at the developing position is discriminated by unshown microswitches.

A transfer sheet for receiving an image is transported through a sheet guide 5a, a sheet feeding roller 6 and a sheet guide 5b and is held by a gripper 7. The sheet is electrostatically wrapped around a transfer drum 9 by a contact roller 8 and an opposite electrode. The transfer drum 9 is rotated in the direction indicated by an arrow in synchronism with the photosensitive drum 3. The image developed and visualized by the yellow developing device 1Y is transferred to the transfer sheet at the transfer station provided with a transfer charger 10. The transfer drum 9 continues to rotate while holding the transfer sheet to be prepared for the image transfer in the next color, more particularly, a magenta image in the example of FIG. 1 embodiment.

On the other hand, the photosensitive drum 3 is discharged by a discharger 11 and is then cleaned by a cleaning member 12. The photosensitive drum 3 is again charged by a charger 4 and is exposed to the laser beam which is then modulated in accordance with a magenta image signal. During this, the rotary developing device 1 rotates to place the magenta developing device 1M at a predetermined developing position to perform a developing operation in the magenta color. Subsequently, the above-described steps are repeated for each of the cyan and black colors. When the transfer operations for four colors are completed, the visualized four color image on the transfer sheet is discharged by dischargers 13 and 14. The transfer sheet is released from the gripper 7 and is separated from the transfer drum 9 by a separation pawl 15 and is transported to an image fixing device 17 by a conveying belt 16. Thus, a series of full color printing operations is completed to provide a full-color print image.

Further, in this embodiment, there is provided in addition to the above-described structures with an ambience sensor 19 including a humidity sensor and a temperature sensor disposed at a position where the moisture absorption of the toner is properly reflected, such as a neighborhood of a toner hopper or the neighborhood of the developing device.

Figure 2:
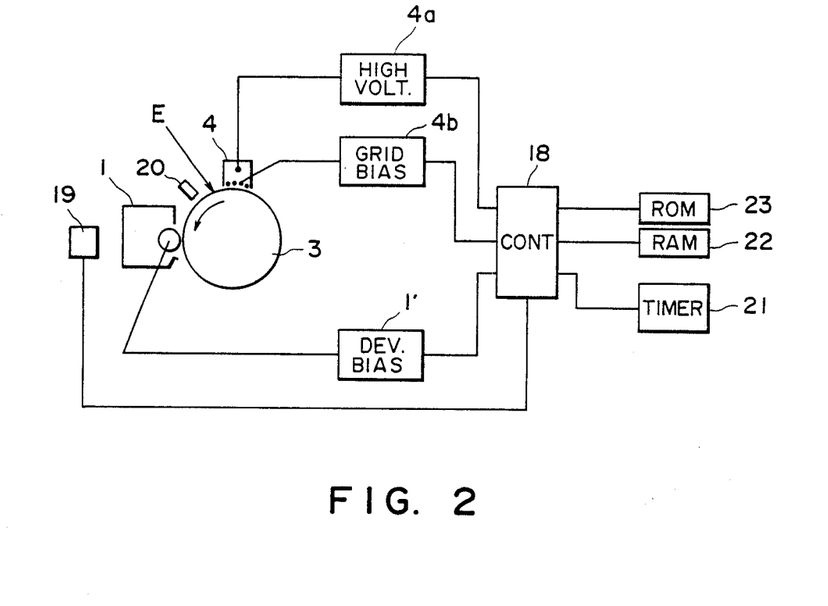
FIG. 2 is a block diagram for the control of FIG. 1 apparatus.

FIG. 2 is a block diagram of the control system for FIG. 1 apparatus.

The primary charger 4 is supplied with a high voltage from a high voltage source 4a. The primary charger 4 is provided with a grid for controlling an amount of charge applied to the photosensitive drum 3, the grid being supplied with electric power from a grid bias source 4b. A developing bias source provides a developing bias in the form of a combined AC and DC voltages. The outputs of the power sources are controlled by a microcomputer 18 or the like. The control means 18 is also connected to the ambience sensor 19 and a potential sensor 20.

Next, the operation of this embodiment will be described.

Figure 3:
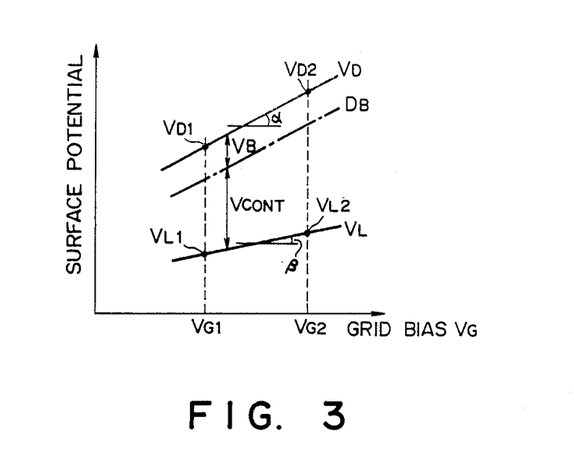
FIG. 3 is a graph showing a relationship between an grid bias voltage and a drum surface potential.

Referring to FIG. 3, there is shown a relationship between a grid bias voltage and a surface potential of the photosensitive drum 3. In this FIG., $V_D$ is a surface potential of the area not exposed to the light beam, while $V_L$ is a surface potential of the area exposed to the light beam. As will be understood from this Figure, the surface potential $V_D$, that is, the amount of charge is proportional to the grid bias $V_G$. The surface potential $V_L$ after the light exposure has a similar tendency. However, a ratio of change of $V_D$ with respect to a change of the grid bias $V_G$, is larger than that for $V_L$, that is, $\alpha > \beta$. In consideration of this, the control means 18, before execution of the printing sequenses, measures the potentials $V_D$ and $V_L$ using a potential sensor 20 for predetermined grid voltages $V_{G1}$ and $V_{G2}$, so that charging curves for the potentials $V_d$ and $V_L$ with respect to a grid voltage as shown in FIG. 3 is assumed on the basis of data by the potential sensor 20. Subsequently, when the image forming operation is actually executed, a grid voltage which provides a predetermined image contrast, that is, a difference between a DC component of a developing bias which will be described hereinafter and a surface potential $V_L$ after image exposure, or $V_D - V_L$ is determined on the basis of the charging curve. The grid voltage is determined in this manner, and the grid bias source 4b is controlled to provide the voltage. Further, a developing bias $D_b$ is determined to be lower than the potential $V_D$ by a predetermined voltage $(V_B)$ so as to prevent deposition of the toner onto the area corresponding to the background of the image, that is, the area corresponding to $V_D$ in this case since a reversal development is effected, and the developing bias source 1' is controlled, accordingly.

Figure 4:
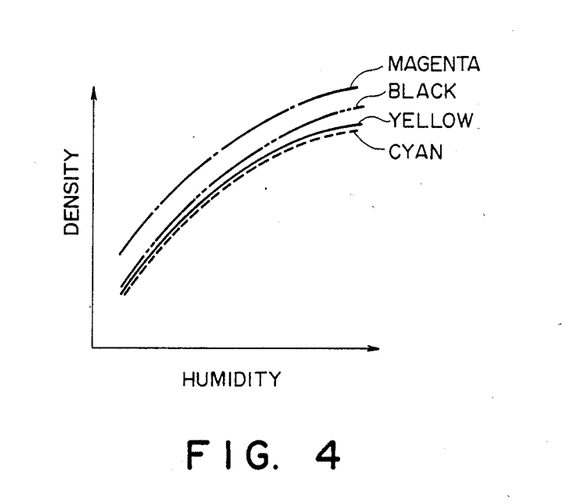
FIG. 4 is a graph showing a density change by humidity change for each color developer.

FIG. 4 is a graph showing influence of humidity to the image density when the printing is effected under the same image forming conditions. As will be understood from this graph, the density decreases with the humidity under the same image forming conditions, and it increases with the increase of the humidity. Therefore, the humidity is detected, and a contrast potential Vcont corresponding to a humidity is determined. On the basis of the value, the image forming condition or conditions are set, whereby a stablized image can be obtained irrespective of variation of the ambient conditions. Also understood from this figure is that the image density is different if the color of the developer is different even in the same humidity. Therefore, the image forming condition or conditions are made variable for the respective colors, whereby the image density variation depending on the color of the developer can be corrected.

Figure 5A:
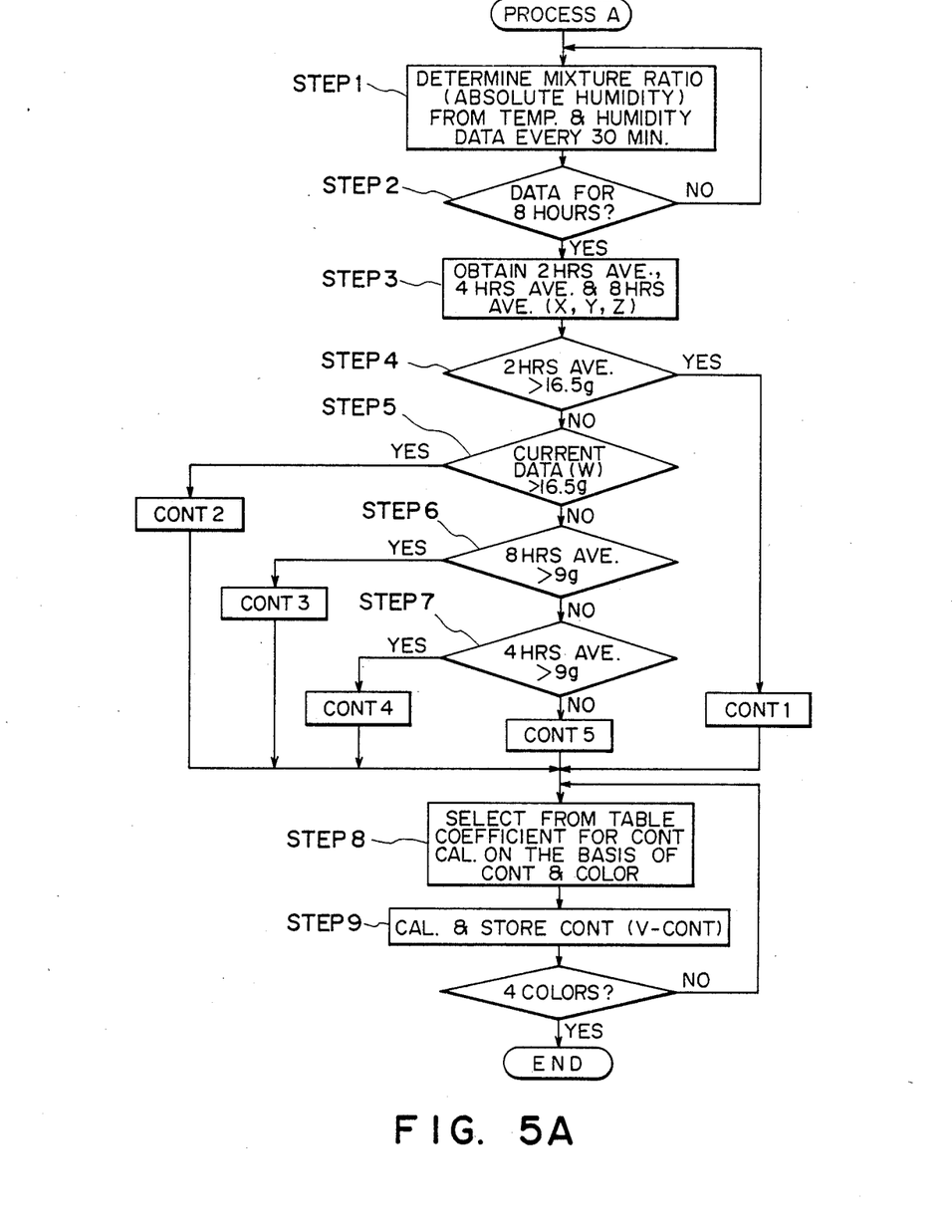
FIGS. 5A, 5B, 5C and 5D are flow charts illustrating a process of setting image forming conditions in FIG. 1 apparatus.
Figure 5B:
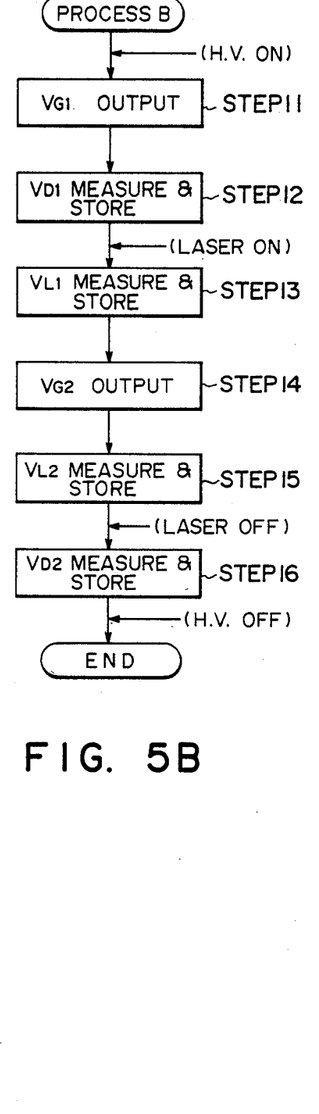
Figure 5C:
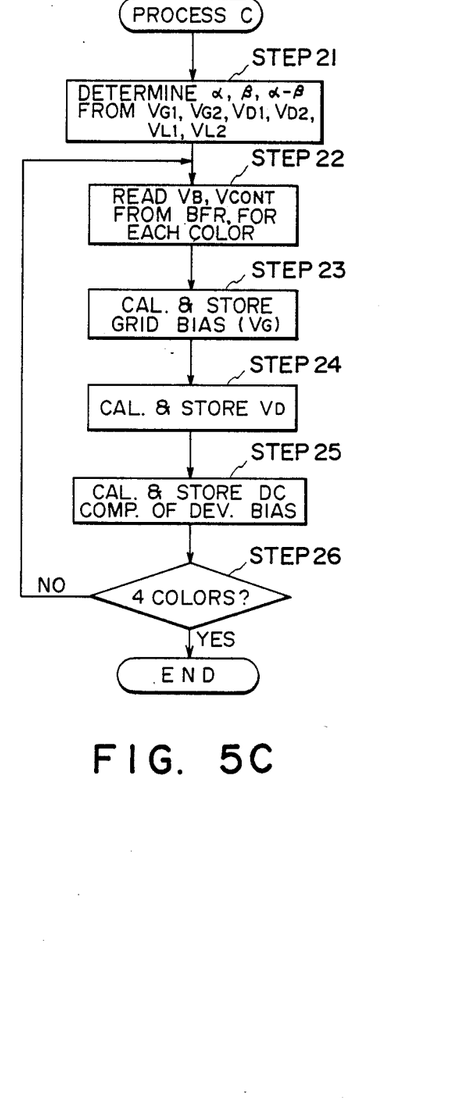

Referring to FIGS. 5A, 5B and 5C which are flow charts, operations of the control means 18 in this embodiment will be described. The processing shown in those flow charts is programmed in a ROM 23.

First, a processing A will be described referring to FIG. 5A. The ambience sensor 19 measures the temperature and the relative humidity every 30 minutes, for example, or several times in every 30 minutes, and an average value is determined. The ambience sensor 19 is operative irrespective of the state of a main switch supplying power to the image forming apparatus, by an interruption function using a timer 21. The data are stored in a buffer area in a memory 22 capable of storing data for 8 hours, for example. At step 1, an absolute humidity or a value corresponding thereto (a mixture ratio, for example) is determined on the basis of the stored data. This is done because the image density is proportional to the absolute humidity, that is, an amount of water in the air. The humidity sensor in this embodiment is a relative humidity sensor having a strong temperature dependence. Since it is non-linear, a relative humidity h is determined on the basis of the temperature data and the humidity data using a high-quarter polynomial approximation, and thereafter, the absolute humidity (mixture ratio) r is obtained by the following equations:

$$e = h \times e_s/100$$

$$r = 0.622\, e/(p-e)$$

wherein
  $e_s$: saturated vapor pressure
  p: pressure

In the equations, $E_s$ has a temperature dependence property, and therefore temperature data are required to obtain the absolute humidity (mixture ratio). Therefore, the ROM stores a table for every 1° C., and a table search is performed for the determination. At step 2, a discrimination is made as to whether or not the absolute humidity (mixture ratio) calculations have been executed for the eight hour period, and if so, at step 3, average values x, y and z are determined for the latest 2 hours, 4 hours and 8 hours, respectively. The averages x, y and z are parameters when the contrast is determined. By the steps 4-7, the humidity change is discriminated. At step 4, the discrimination is made as to whether or not the two hours average x of the mixture ratio is 16.5 g or larger, and if so a flag is set to CONT1. In this case, it is discriminated that the high humidity condition continues for not less than two hours. If not, at step 5, the discrimination is made as to whether or not the current mixture ratio w is 16.5 g or larger, and is so, the flag is set to CONT2. Here, the current mixture ratio w is represented by the latest humidity data. The flag CONT2 corresponds to the discrimination that the low humidity condition continued for the past two hours, but the humidity is increasing now. If not, at step 6, the discrimination is made as to whether or not the eight hours average z is 9 g or larger, and if so, the flag is set to CONT3. This means that the humidity has been middle (middle between the high humidity and the low humidity) for 8 hours or longer. If not, at step 7, the discrimination is made as to whether or not the four hours average y is 9 g or larger, and if so, the flag is set to CONT4. It is now discriminated that the humidity is changing from the low humidity condition to an intermediate or middle humidity condition. If not, that is, the four hours average is less than 9 g, the low humidity condition is discriminated so that the flag is set to CONT5.

The above described method of discrimination is performed because the speeds of the moisture, or wetness, absorption and dehumidification of the toner are different between when the humidity is changing from the low humidity condition to the high humidity condition and when it is changing from the high humidity condition to the low humidity condition. Generally, the speed of the dehumidification when the humidity is changing from the high humidity condition to the low humidity condition is lower than the speed of the moisture absorption when the humidity is changing from the low humidity condition to the high humidity condition. It is true that the image density is influenced by the absolute moisture, but, more particularly, the influence is determined not by the humidity of the ambience but by the moisture absorption by the toner. This is the reason for executing the above-described discrimination steps.

At step 8 a variable H for the contrast calculation is determined on the basis of the contrast flag. For example, when the CONT1 is selected, it means that the toner is completely influenced by the high humidity condition, and therefore, the variable H corresponds to the two hours average x. When the CONT2 is selected, that is, it is between the low humidity condition and the high humidity condition, the variable H is an average of the two hours average x and the current value w, that is, $(x+w)/2$.

Further, by the contrast flag and color information representing the color of the developer, a coefficient of calculation is searched and read out of the table in the memory 23. A general equation of the calculation is $$V\text{cont} = A_n - B_n \times H_n$$

Vcont: contrast potential
$H_n$: variable
$A_n$ and $B_n$: coefficients
n: number of CONT flag.

The following is a Table giving $A_n$, $B_n$ and $H_n$ for the respective CONTs.

TABLE 1

| DEVELOPER | CONT | $a_n$ | $b_n$ | $H_n$ |
|---|---|---|---|---|
| Y | 1 | $a_{1Y}$ | $b_{1Y}$ | x |
|  | 2 | $a_{2Y}$ | $b_{2Y}$ | $(x+w)/2$ |
|  | 3 | $a_{3Y}$ | $b_{3Y}$ | $(x+z+w)/3$ |
|  | 4 | $a_{4Y}$ | $b_{4Y}$ | $(y+z)/2$ |
|  | 5 | $a_{5Y}$ | $b_{5Y}$ | y |
| M | 1 | $a_{1M}$ | $b_{1M}$ | x |
|  | 2 | $a_{2M}$ | $b_{2M}$ | $(x+w)/2$ |
|  | 3 | $a_{3M}$ | $b_{3M}$ | $(x+z+w)/3$ |
|  | 4 | $a_{4M}$ | $b_{4M}$ | $(y+z)/2$ |
|  | 5 | $a_{5M}$ | $b_{5M}$ | y |
| C | 1 | $a_{1C}$ | $b_{1C}$ | x |
|  | 2 | $a_{2C}$ | $b_{2C}$ | $(x+w)/2$ |
|  | 3 | $a_{3C}$ | $b_{3C}$ | $(x+z+w)/3$ |
|  | 4 | $a_{4C}$ | $b_{4C}$ | $(y+z)/2$ |
|  | 5 | $a_{5C}$ | $b_{5C}$ | y |
| BK | 1 | $a_{1BK}$ | $b_{1BK}$ | x |
|  | 2 | $a_{2BK}$ | $b_{2BK}$ | $(x+w)/2$ |
|  | 3 | $a_{3BK}$ | $b_{3BK}$ | $(x+z+w)/3$ |
|  | 4 | $a_{4BK}$ | $b_{4BK}$ | $(y+z)/2$ |
|  | 5 | $a_{5BK}$ | $b_{5BK}$ | y |

On the basis of the coefficients $A_n$ and $B_n$ and the variable $H_n$, the contrast potential Vcont is calculated, and at step 9, it is stored in the memory. This is repeated for four colors.

As described in the foregoing, one of CONT-1-CONT5 is selected on the basis of the average humidity data x, y and z and the current value w. If the flag of CONT3 is selected, a type of the variable H and the coefficient $a_3$ and $b_3$ are obtained from the table stored in the memory ROM23, thus determining the calculation equation. Using the equation, the contrast potential Vcont is determined using the actual values for the variation H.

Figure 6:
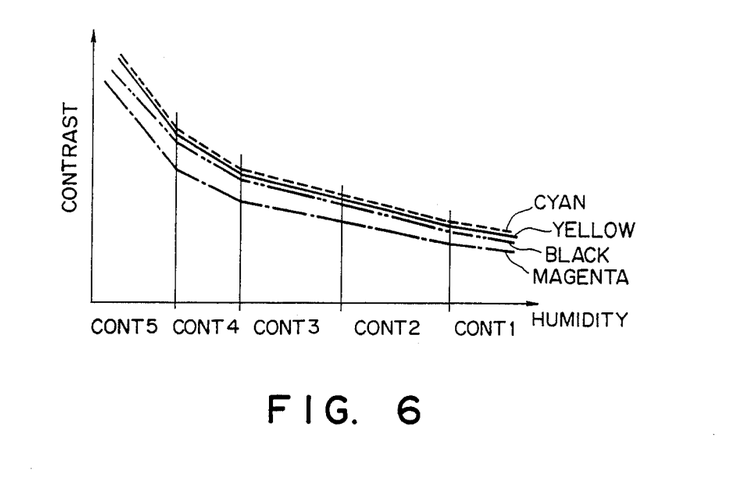
FIG. 6 is a graph showing a relationship between the humidity and a set contrast potential.

FIG. 6 is a plot of contrast potentials with respect to humidities for respective colors of the developer. As will be understood from this Figure, the coefficients are changed for the respective colors, the difference in the density variation depending on the colors can be accommodated and can be properly corrected.

Referring to FIG. 5B, the description will be made as to the processing B. First, similarly to the usual copying sequence, the photosensitive drum is rotated, and the primary high voltage source 4a is energized. At steps 11 and 12, the grid bias is set to a predetermined level $V_{G1}$, and a surface potential of the photosensitive drum in the dark area $V_{D1}$ is measured and stored in the memory. Next, the laser is actuated, and the drum is exposed to the maximum amount of the laser beam. At step 13, the light surface potential $V_{L1}$ after the light exposure is measured, and the data is stored in the memory. At steps 14 and 15, the grid bias is set to another predetermined level $V_{G2}$, and the surface potential $V_{L2}$ is measured, and then, the laser is deactivated. At step 16, the surface potential $V_{D2}$ is measured, and the data is stored in the memory 22. By this, data required for the calculation which will be described hereinafter have been obtained.

The order of $V_D$ and $V_L$ measurements with the laser actuation and deactivation and the order of setting $V_{G1}$ and $V_{G2}$ may be changed for the convenience of the sequential operation. The processings A and B are independent from each other, and either will go first, and it is not necessary that the processings are performed simultaneously.

Referring to FIG. 5C, the description will be made as to the processing C. The processing C has to be performed after the processings A and B are performed.

At step 21, the inclinations $\alpha$ and $\beta$ for the potentials $V_D$ and $V_L$ and the difference D between $\alpha$-$\beta$ are calculated from $V_{G1}$, $V_{G2}$, data $V_{D1}$, $V_{D2}$, $V_{L1}$ and $V_{L2}$ by the following equations:

$$\alpha = (V_{D2} - V_{D1})/(V_{G2} - V_{G1})$$

$$\beta = (V_{L2} - V_{L1})/(V_{G2} - V_{G1}).$$

At step 22, the above described fog preventing voltage $V_B$ and the contrast voltage Vcont obtained by the processing A are read out of the buffer area. At step 23, the grid bias $V_G$ is set so that $V_D - V_L$ equals to Vcont+$V_B$. More particularly, the following calculation is performed:

$$V_G = \{Vcont + V_B - (V_{D1} - V_{L1})\}/(\alpha - \beta) + V_{G1}$$

After the grid voltage is determined at step 24, the potential $V_D$ is obtained by the following equation:

$$V_D = \alpha(V_G - V_{G1}) + V_{D1}$$

Further, at step 25, the DC component (DB) of the developing bias is obtained at step 25 by the following equation:

$$DB = V_D - V_B$$

At step 26, if it is discrimated that the above processing is completed for four colors, the processing terminates.

By the above described steps, the grid bias control value $V_G$ and the developing bias control value DB have been obtained. Then, the image forming operation is performed using the grid bias voltage $V_g$ and the developing bias DB obtained in the manner described above. Since those values are determined not only on the basis of the humidity condition under which the developed has been placed but also on the basis of the property difference among the developers having different colors, an extremely stabilized proper density image can be obtained.

As described in the foregoing, the present invention takes as an important factor for determining the image forming condition or conditions the history of the humidity. Therefore, it is required that the apparatus is always energized to allow the temperature data and the relative humidity data to be taken. However, when, for example, the apparatus is initially installed or when the ambience sensor is failed, the buffer area does not contain any data or it contains false data. Therefore, the proper image forming conditions would not be provided immediately after the repairing or the like.

Figure 7:
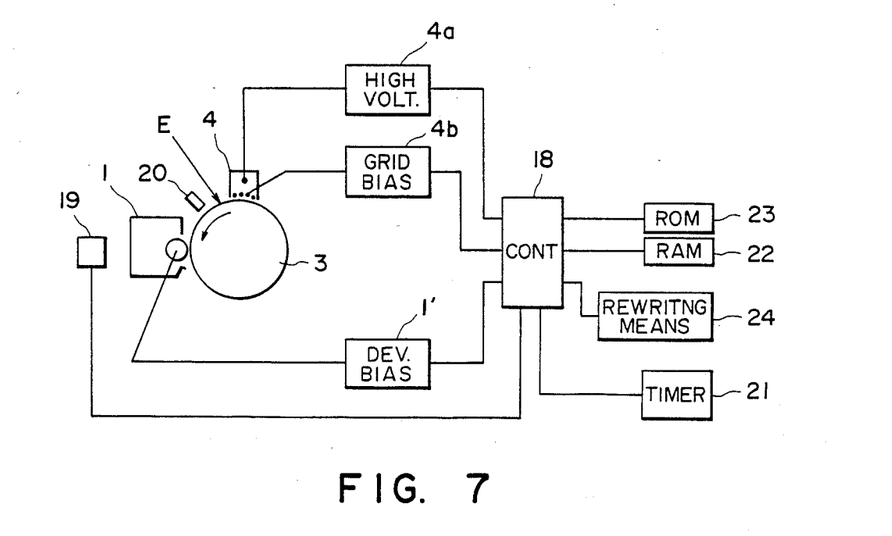
FIGS. 7 and 8 are block diagram for the control of an image forming apparatus according to another embodiment of the present invention.

Referring to FIG. 7, an embodiment of the present invention to obviate this inconvenience will be described. The apparatus of FIG. 7 is provided in addition to FIG. 1 apparatus with a rewriting means 24 for rewriting the humidity data stored in the memory 22. In this apparatus, following process is executed.

Figure 5D:
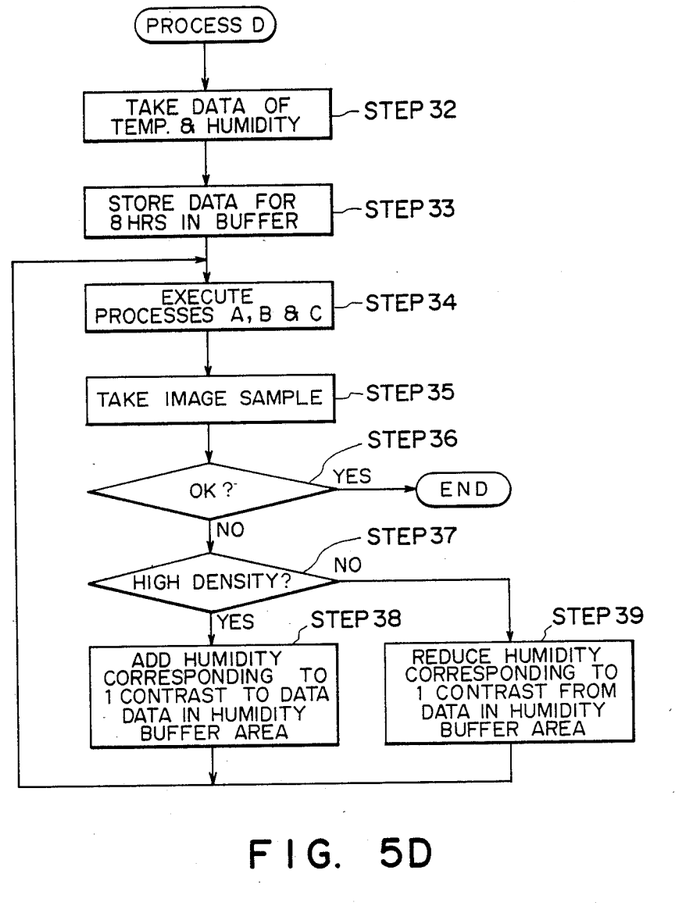

Referring to FIG. 5D, at step 32, the temperature and humidity are measured immediately after the apparatus is energized. At step 33, the data are stored in the entirety of the 8 hours buffer area of the memory, assuming that the measured temperature and humidity are constantly continued for 8 hours. At step 34, the above-described processings A, B and C are executed. At step 35, an expert service man or the like takes a copy using a normal copying sequence to take a sample of an image. At step 36, the image density is checked. The image density is not always proper. For example, if the humidity is high at the time of insulation of the apparatus, the eight hours humidity data are all high humidity data, and therefore, the contrast potential is determined on the data. However, the toner supplied into the apparatus at the time of installation is mainly influenced by the moisture under the ambience sealed in the plant, which might be completely different from the ambience of the installation. In view of this, in the present embodiment, when the image density is discriminated as being not proper at steps 38 and 39, the humidity data is rewritten by a humidity data rewriting means 24 using a servicing mode. In this mode, the humidity data are rewritten all at once. In this embodiment, the humidity data rewriting means 24 includes two keys, one of which can rewrite toward the low humidity side, and the other of which rewrites toward the high humidity side. By depressing the switch, the humidity data is changed by an amount corresponding to one contrast change. In this embodiment, the one contrast change corresponds to 50 V of the drum surface potential.

By the initial setting through the above process, the proper image can be provided from the start. Furthermore, with elapse of the time, the temperature and humidity data are accumulated so that the proper images can be provided.

However, the property of the developer can be extremely different from lot to lot. On such an occasion, if the coefficient of the contrast calculation is fixed, a proper image density can not be obtained as the case may be.

Figure 8:
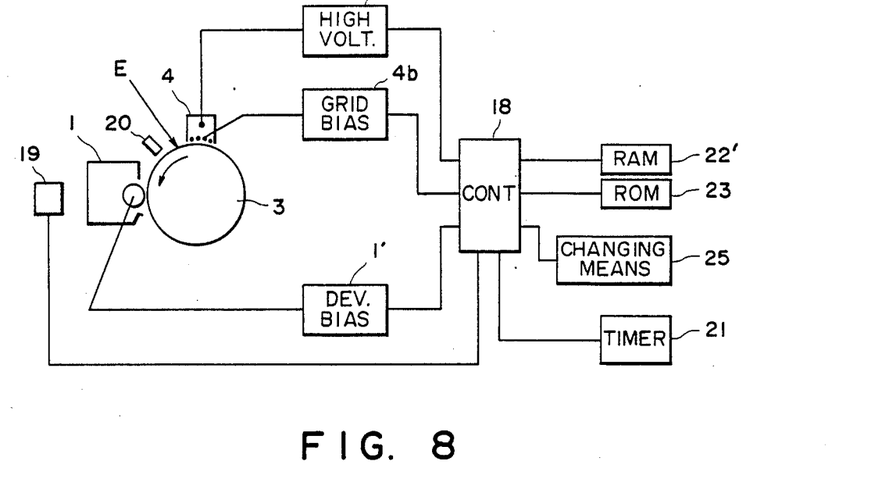

Referring to FIG. 8, there is shown an embodiment which can provide a proper image even if that case. The apparatus of this embodiment is provided in addition to FIG. 1 apparatus with memory means 22' which can keep the memory even if the power supply is stopped. As an example, the memory means 22' includes a RAM and a back-up battery or includes EPROM. The memory means 22' stores the data to be added at the time of the contrast calculation for each of the colors. The contents thereof can be rewritten by a changing means 25 in a servicing mode, so that proper adjustment can be effected, checking the image samples.

The above-described contrast calculation can be expressed by:

$$V_{cont} = V_{off} + a_n - b_n H_n$$

Figure 9:
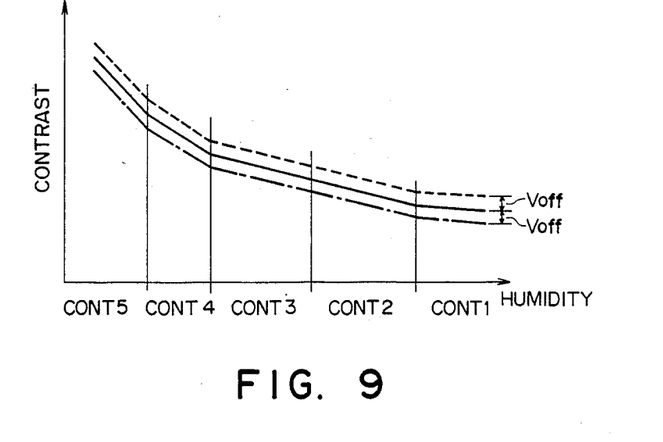
FIG. 9 is a graph showing a contrast potential changed by a changing means.

That is, at step 9 in FIG. 5A, the contrast is changed, and the contrast is stored in the memory at step 10. Further, the humidity-contrast curve of FIG. 6 becomes as shown in FIG. 9. In FIG. 9, the solid line curve is a curve at the time of initial setting, and when, for example, the image density is lower than the initial setting, $V_{off}$ is positive, and the broken line curve is used. If the density is high, $V'_{off}$ becomes negative as shown in chain lines.

In place of adding or reducing $V_{off}$, a RAM 22' may store coefficients $a_n$ and $b_n$ and variable $H_n$, and the coefficients $a_n$, and $b_n$ may be rewritten by the changing means 25 for each of the CONT1–CONT5 and for each color. By this, further proper contrast value can be provided.

By the above described processing, which changes the contrast potential, a proper image density can be provided in the case that the properties of the developer are significantly different.

The foregoing description has been made as to a multi-color image forming apparatus. However, the present invention is applicable to usual monochromatic image forming apparatus. Also, the present invention is applicable to the apparatus wherein an image of an original is directly projected on the photosensitive member, and the image thereof is formed.

In the foregoing description, the ambient detecting means detects the absolute humidity. However, the image density may be controlled on the basis of the measurement of a factor or factors influential to the developer such as temperature other than the humidity to control the image density.

In the foregoing, the image forming condition is determined on the basis of the charge potential on the photosensitive drum, the potential after the light application and the potential of the developing bias. However, other condition or conditions may be controlled such as charged potential of the developer or amount of light application or the like. When the light amount is controlled, it is increased when the humidity is low, while it is decreased when the humidity is high. In the foregoing description, the contrast levels are divided into five levels (CONT1-CONT5). However, the number of division may be increased further.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
   image forming means for forming images on a recording medium, said image forming means being capable of forming the images in different colors;
   means for detecting an ambient condition;
   means for determining a contrast voltage to be given to said recording medium in accordance with both the ambient condition detected by said detecting means and a color in which the image is to be formed; and
   control means for controlling an operating condition of said image forming means in accordance with the contrast determined by said determining means.

2. An apparatus according to claim 1, wherein said detecting means detects a humidity in said apparatus.

3. An apparatus according to claim 2, wherein said detecting means detects an absolute humidity.

4. An apparatus according to claim 1, wherein said image forming means includes means for charging a recording medium, and wherein said control means controls a degree of charging by said charging means.

5. An apparatus according to claim 4, wherein said image forming means includes plural developing means containing different color developers, and wherein said control means controls a developing bias voltage of said developing means.

6. An apparatus according to claim 4, wherein said charging means includes a grid electrode.

7. An apparatus according to claim 6, wherein said control means controls a voltage applied to said grid electrode in accordance with the contrast voltage.

8. An apparatus according to claim 1, wherein said image forming means includes means for exposing the recording medium in accordance with an image signal.

9. An apparatus according to claim 1, further comprising means for detecting a temperature, wherein said control means corrects the outputs of said detecting means in accordance with the temperature detected by said temperature detecting means to control said image forming means with the corrected output.

10. An apparatus according to claim 1, wherein said image forming means includes plural developing means containing different color developers.

11. An image forming apparatus, comprising:
    image forming means for forming an image on a recording medium;
    sensor means for sensing an ambient condition in a time series;
    discriminating means for discriminating a state of change in the ambient condition on the basis of ambient condition data sensed in the time series; and
    control means for controlling an image forming condition, relating to an image density, of said image forming means in accordance with outputs of said sensor means and said discriminating means.

12. An apparatus according to claim 11, wherein said sensor means senses a humidity in said apparatus.

13. An apparatus according to claim 12, wherein said discriminating means discriminates whether the humidity is increasing or decreasing from a past humidity.

14. An apparatus according to claim 12, wherein said discriminating means includes means for storing plural humidities detected by said sensor means within a predetermined period of time.

15. An apparatus according to claim 14, wherein said discriminating means determines plural times an average of the humidities within different time periods.

16. An apparatus according to claim 14, wherein said storing means renews stored data from the oldest data.

17. An apparatus according to claim 12, wherein said sensor means detects an absolute humidity.

18. An apparatus according to claim 11, wherein said image forming means is capable of forming images in different colors, and wherein said control means controls said image forming means in accordance with a color of image formation.

19. An apparatus according to claim 18, wherein said image forming means includes plural developing means containing different color developers.

20. An apparatus according to claim 11, wherein said image forming means includes means for charging a recording medium, and wherein said control means controls a degree of charging by said charging means.

21. An apparatus according to claim 20, wherein said image forming means includes plural developing means containing different color developers, and wherein said control means controls a developing bias voltage of said developing means.

22. An apparatus according to claim 20, wherein said charging means includes a grid electrode, and said control means controls a voltage applied to the grid electrode to give a contrast voltage to the recording medium in accordance with the ambient condition.

23. An image forming apparatus, comprising:
image forming means for forming an image on a recording medium;
means for detecting an ambient condition;
means for determining a contrast voltage to be given to said recording medium in accordance with the ambient condition detected by said detecting means to stabilize a density of the image formed by said image forming means, wherein said determining means changes processing to provide the contrast voltage; and
control means for controlling an operating condition of said image forming means in accordance with the contrast voltage determined by said determining means.

24. An apparatus according to claim 23, wherein said detecting means detects a humidity in said apparatus.

25. An apparatus according to claim 23, wherein said determining means changes a constant for the processing in accordance with the detected ambient condition.

26. An apparatus according to claim 25, wherein said determining means changes a variable for the processing in accordance with the detected ambient condition.

27. An apparatus according to claim 26, wherein said detecting means includes a table storing the constants and the variable.

28. An apparatus according to claim 25, wherein said image forming means is capable of forming images in different colors, and wherein said determining means changes a constant for the processing in accordance with the color in which the image is formed.

29. An apparatus according to claim 25, wherein said determining means includes a table storing the constants.

30. An apparatus according to claim 23, wherein said image forming means includes means for charging a recording medium, and wherein said control means controls a degree of charging by said charging means.

31. An apparatus according to claim 30, wherein said charging means includes a grid electrode, and said control means controls a voltage applied to the grid electrode.

32. An apparatus according to claim 23, wherein said image forming means includes means for developing a latent image formed on said recording medium, and said control means controls a developing bias of said developing means.

33. An apparatus according to claim 23, wherein said image forming means is capable of forming images in plural colors, and wherein said controls means controls said image forming means in accordance with the colors.

34. An image forming apparatus, comprising:
image forming means for forming an image on a recording medium;
means for detecting an ambient condition; and
control means for controlling an image forming condition, relating to an image density, of said image forming means in accordance with an output of said detecting means, said control means including a table storing a coefficient and a variable of a predetermined equation giving the image forming condition and selecting the coefficient and the variable from the table in accordance with an output of said detecting means;
wherein said image forming means is capable of forming images in plural colors, and wherein said control means selects the coefficient from said table in accordance with a color of image formation.

35. An apparatus according to claim 34, wherein said control means determines a proper contrast potential of the recording medium in accordance with the predetermined equation.

36. An apparatus according to claim 35, further comprising manual input image for correcting the contrast potential determined by said control means.

37. An apparatus according to claim 36, wherein said input means is effective at the time of manual mode.

38. An apparatus according to claim 35, wherein said image forming means includes charging means for charging the recording medium, and wherein said control means controls the charging means in accordance with the contrast voltage.

39. An apparatus according to claim 34, wherein said image forming means includes plural developing means containing different color developers.

40. An apparatus according to claim 34, wherein said detecting means detects a humidity in said apparatus.

41. An image forming apparatus, comprising:
image forming means for forming an image on a recording medium;
means for detecting an ambient condition;
means for storing a history of outputs of said detecting means within a predetermined period of time, said storing means storing plural outputs of said detecting means at different times;
manual input means for rewriting data stored in said storing means;
control means for controlling an image forming condition, relating to an image density, of said image forming means in accordance with the plural data stored in said storing means.

42. An apparatus according to claim 41, wherein said detecting means detects a humidity in said apparatus.

43. An apparatus according to claim 41, wherein said storing means stores outputs of said detecting means for each predetermined period of time.

44. An apparatus according to claim 41, wherein said manual input means rewrites data therein all at once.

45. An apparatus according to claim 41, wherein when said storing means does not contain data in a predetermined period of time, all contents of said storing means are rewritten to be a latest output of said detecting means.

46. An apparatus according to claim 41, wherein said image forming means is capable of forming images in plural colors, wherein said control means controls said image forming means in accordance with the colors.

47. An apparatus according to claim 46, wherein said image forming means includes plural developing means containing different color developers.

48. An apparatus according to claim 41, wherein said image forming means includes means for charging said recording medium, and wherein said control means controls a degree of charging by said charging means.

49. An apparatus according to claim 48, wherein said charging means includes a grid electrode, and said control means controls a voltage applied to the grid electrode to give a contrast voltage to the recording medium in accordance with the ambient condition.

50. An apparatus according to claim 41, wherein said input means is effective at the time of a special mode.

51. An image forming apparatus, comprising:
  image forming means for forming an image on a recording medium;
  means for detecting an ambient condition;
  means for determining a contrast voltage to be given to the recording medium in accordance wiht the ambient condition detected by said detecting means to provide an optimum image density of the image formed by said image forming means; and
  a memory for storing data for correcting the contrast voltage determined by said determining means; the correction data and the contrast voltage determined by said determining means.

52. An apparatus according to claim 51, further comprising manual input means for rewriting the corrected data stored in said memory.

53. An apparatus according to claim 52, wherein said input means is effective at the time of a manual mode.

54. An apparatus according to claim 51, wherein said detecting means detects a humidity in said apparatus.

55. An apparatus according to claim 51, wherein said image forming means is capable of forming images in plural colors, and wherein said control means controls said image forming means in accordance with the colors.

56. An apparatus according to claim 55, wherein said image forming means includes plural developing means containing different color developers.

57. An apparatus according to claim 55, wherein said memory stores different data depending on colors in which the image is to be formed.

58. An apparatus according to claim 51, wherein said image forming means includes charging means for charging the recording medium, and wherein said control means controls the charging means in accordance with the contrast voltage.

59. An apparatus according to claim 51, wherein said image forming means includes means for developing a latent image formed on said recording medium, and said control means controls a developing bias of said developing means.

60. An image forming apparatus, comprising:
  image forming means for forming images on a recording medium, said image forming means including means for forming latent images on said recording medium and means for developing the latent images with developer;
  means for detecting an ambient condition;
  means for discriminating wetness of the developer in accordance with the ambient condition detected by said detecting means; and
  control means for controlling an operating condition of said image forming means in accordance with the discrimination by said discriminating means to stabilize an image density of the images formed by said image forming means.

61. An apparatus according to claim 60, wherein said detecting means detects a humidity in said apparatus.

62. An apparatus according to claim 61, wherein said detecting means detects an absolute humidity.

63. An apparatus according to claim 60, wherein said latent image forming means includes means for charging the recording medium, wherein said control means controls a degree of charging by said charging means.

64. An apparatus according to claim 63, wherein said charging means includes a grid electrode, and wherein said control means controls a voltage applied to the grid electrode.

65. An apparatus according to claim 60, wherein said control means controls a developing bias potential of said developing means.

66. An apparatus according to claim 60, further comprising means for detecting a temperature in said apparatus, and wherein said control means corrects an output of said detecting means in accordance with the temperature detected by said temperature detecting means to control said image forming means.

67. An apparatus according to claim 60, wherein said discriminating means discriminates whether the developer is in the process of wetting, drying or in stabilization.

68. an apparatus according to claim 60, wherein said image forming means controls the contrast to be given to the recording medium in accordance with the discrimination by said discriminating means.

* * * * *

UNITED STATES PATENT AND TRADEMARK OFFICE
CERTIFICATE OF CORRECTION

PATENT NO. : 4,888,618

DATED : December 19, 1989

INVENTOR(S) : TADASHI ISHIKAWA

Page 1 of 3

It is certified that error appears in the above-identified patent and that said Letters Patent is hereby corrected as shown below:

COLUMN 1

Line 8, "wherein" should read --wherein an--.
    Line 40, "colors" should read --color--.
    Line 42, "of" should read --or--.(2nd Occur.)
    Line 49, "a" should read --the--.

COLUMN 2

Line 38, "an" should read --a--.
    Line 41, "FIGS. 5A, 5B," should read
        --¶ FIGS. 5A, 5B,--.
    Line 46, "diagram" should read --diagrams--.
    Line 58, "an" should read --a--.

COLUMN 3

Line 3, "an" should read --a--.
    Line 48, "structures with" should read --structures,--.
    Line 62, "voltages" should read --voltage--.

COLUMN 4

Line 13, "sequenses" should read --sequences--.
    Line 24, "$V_D - v_L$" should read --$V_D - V_L$--.
    Line 27, "developing bias $D_b$" should read
        --developing bias $D_B$--.

UNITED STATES PATENT AND TRADEMARK OFFICE
CERTIFICATE OF CORRECTION

PATENT NO. : 4,888,618
DATED : December 19, 1989
INVENTOR(S) : TADASHI ISHIKAWA

It is certified that error appears in the above-identified patent and that said Letters Patent is hereby corrected as shown below:

COLUMN 5

Line 11, "," should be deleted.
    Line 13, "," should be deleted.
    Line 18, "$E_s$" should read --$e_s$--.
    Line 36, "is" should read --if--. (2nd Occur)

COLUMN 7

Line 29, "inclinations 60" should read
          --inclinations $\alpha$--.
    Line 67, "developed" should read --developer--.

COLUMN 12

Line 1, "controls means" should read --control means--.
    Line 29, "manual mode." should read --a manual mode.--.

COLUMN 13

Line 23, "wiht" should read --with--.
    Line 28, "means; the" should read --means; and
          control means for controlling an operating
          condition of said image forming means
          in accordance with both the--.

UNITED STATES PATENT AND TRADEMARK OFFICE
CERTIFICATE OF CORRECTION

PATENT NO. : 4,888,618

DATED : December 19, 1989

INVENTOR(S) : TADASHI ISHIKAWA

It is certified that error appears in the above-identified patent and that said Letters Patent is hereby corrected as shown below:

COLUMN 14

Line 48, "an" should read --An--.

Signed and Sealed this

Eighteenth Day of August, 1992

Attest:

DOUGLAS B. COMER

Attesting Officer      Acting Commissioner of Patents and Trademarks